United States Patent
Wang et al.

(10) Patent No.: US 10,632,571 B2
(45) Date of Patent: Apr. 28, 2020

(54) METAL JOINING USING ULTRASONIC AND REACTION METALLURGICAL WELDING PROCESSES

(71) Applicant: GM GLOBAL TECHNOLOGY OPERATIONS LLC, Detroit, MI (US)

(72) Inventors: Hongliang Wang, Sterling Heights, MI (US); Chen Zhou, Troy, MI (US); Wayne W. Cai, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 15/478,694

(22) Filed: Apr. 4, 2017

(65) Prior Publication Data
US 2018/0281101 A1 Oct. 4, 2018

(51) Int. Cl.
| | |
|---|---|
| B23K 20/00 | (2006.01) |
| B23K 35/24 | (2006.01) |
| B23K 20/10 | (2006.01) |
| B23K 11/34 | (2006.01) |
| B23K 11/11 | (2006.01) |

(52) U.S. Cl.
CPC .............. *B23K 35/24* (2013.01); *B23K 11/11* (2013.01); *B23K 11/34* (2013.01); *B23K 20/10* (2013.01)

(58) Field of Classification Search
CPC .......... B23K 11/20; B23K 11/02; B23K 11/30
See application file for complete search history.

(56) References Cited

U.S. PATENT DOCUMENTS

| | | | |
|---|---|---|---|
| 2004/0048096 A1* | 3/2004 | Doh ..................... | B23K 11/20 428/660 |
| 2007/0152023 A1* | 7/2007 | Huth .................... | H05K 3/3478 228/174 |
| 2016/0141709 A1* | 5/2016 | Kim .................... | H01M 10/049 429/179 |

FOREIGN PATENT DOCUMENTS

| | | |
|---|---|---|
| CN | 203778959 U | 8/2014 |
| CN | 205967225 U | 2/2017 |

\* cited by examiner

*Primary Examiner* — Erin B Saad
(74) *Attorney, Agent, or Firm* — Quinn IP Law

(57) ABSTRACT

According to aspects of the present disclosure, a method includes selecting a faying surface of a first metal substrate, placing a reaction material on the faying surface, and attaching, prior to a second metal substrate being adjacent the first metal substrate, the reaction material to the faying surface via ultrasonic welding. The reaction material is configured to form a metallurgical joint between the faying surface and the second metal substrate adjacent the first metal substrate.

11 Claims, 3 Drawing Sheets

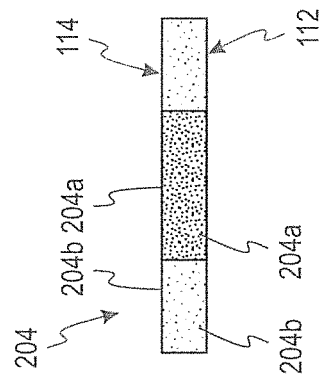
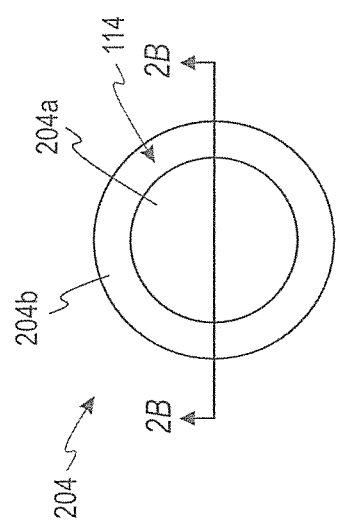

METAL JOINING USING ULTRASONIC AND REACTION METALLURGICAL WELDING PROCESSES

INTRODUCTION

The disclosure relates to the field of reaction metallurgical joining of metal substrates and, more specifically, to systems and methods for pre-placement of a reaction material on a faying surface of at least one of the metal substrates.

Reaction metallurgical joining ("RMJ") uses a reaction material compressed between two metal substrates. The substrates are contacted with electrodes and heated to form a metallurgical joint between the substrates. The reaction material is selected to have a liquidus temperature below the lowest solidus temperature of the two metal substrates being joined and, additionally, to be reactive with the opposed faying surfaces of the substrates. After being heated above at least its solidus temperature (and beforehand if desired), a compressive force is applied to the workpiece substrates, which squeezes and spreads the reaction material, including reaction by-products, along the faying interface of the workpiece substrates. The faying surfaces join together at this time to establish a low-resistivity solid-state metallurgical joint composed mainly of the base workpiece materials as the applied compression substantially expels the reaction material from the joint. However, manual placement of the reaction material is imprecise, and the reaction material can be displaced from the deposited position during the joining process (such as during the compression).

An alternative to manual placement of reaction material is to deposit the reaction material using cold-metal transfer. However, the cold-metal-transfer process has a number of drawbacks as well. For example, it is difficult to precisely control the amount of reaction material deposited. Another drawback is difficulty of creating desirable geometries of the reaction material. For example, it is difficult to create a flattened droplet of reaction material even when the substrate temperature is elevated. Further, creating spherical droplets increases expulsion during the RMJ process. What is more, cold-metal-transfer processes require removal of oxidation after the reaction material is deposited.

SUMMARY

According to aspects of the present disclosure, systems and methods provide for pre-placement of reaction material using ultrasonic welding. Beneficially, systems and methods described herein can provide precise placement of reaction material, provide precise amounts of deposited reaction material, and produce beneficial geometries of the deposited reaction material. Further, systems and methods in accord with the present disclosure can provide for pre-placement of reaction material at room temperature.

According to aspects of the present disclosure, a method includes selecting a faying surface of a first metal substrate, placing a reaction material on the faying surface, and attaching, prior to a second metal substrate being adjacent the first metal substrate, the reaction material to the faying surface via ultrasonic welding. The reaction material is configured to form a metallurgical joint between the faying surface and the second metal substrate adjacent the first metal substrate.

According to further aspects of the present disclosure, the method further includes moving the second metal substrate adjacent the faying surface of the first metal substrate, compressing the reaction material between the first metal substrate and the second metal substrate, and heating the reaction material to join the first metal substrate and the second metal substrate using reaction metallurgical joining.

According to further aspects of the present disclosure, the reaction material defines a geometry configured to control flow of molten material during a reaction metallurgical joining of the first metal substrate to the second metal substrate.

According to further aspects of the present disclosure, the reaction material is a multi-functional reaction material including an internal material and an external material, the internal material being different than the external material.

According to further aspects of the present disclosure, the internal material and the external material each contact the first metal substrate and the second metal substrate prior to heating the reaction material.

According to further aspects of the present disclosure, attaching the reaction material to the faying surface via ultrasonic welding includes contacting a first exterior surface of the first metal substrate opposite the faying surface with an anvil, contacting a second surface of the reaction material with a welding horn, and vibrating the welding horn at a predetermined frequency to thereby ultrasonically weld the reaction material to the faying surface.

According to further aspects of the present disclosure, the method further includes disposing, after attaching the reaction material to the faying surface, the second metal substrate adjacent the first metal substrate, applying a first electrode to the first metal substrate and a second electrode to the second metal substrate, and heating the reaction material via the first electrode and the second electrode to thereby form a metallurgical joint between the first metal substrate and the second metal substrate.

According to further aspects of the present disclosure, the reaction material is a multi-functional reaction material including a first material and a second material. The first material is different than the second material. The first material is configured to promote attaching the reaction material to the faying surface via ultrasonic welding, and the second material configured to promote the metallurgical joint between the first metal substrate and the second metal substrate.

According to further aspects of the present disclosure, the reaction material is a multi-functional reaction material including a first material and a second material. The first material has a first resistivity and a first liquidus temperature, and the second material has a second resistivity and a second liquidus temperature. The first resistivity is higher than the second resistivity, and the first liquidus temperature is lower than the second liquidus temperature.

According to aspects of the present disclosure, a method includes selecting a first faying surface of a first metal substrate, placing a reaction material on the first faying surface, attaching the reaction material to the first faying surface via ultrasonic welding, disposing, after attaching the reaction material to the first faying surface, a second faying surface in contact with the reaction material, and welding the first metal substrate to the second metal substrate via fusion welding. The reaction material is configured to form a metallurgical joint between the first faying surface and a second faying surface of a second metal substrate.

According to further aspects of the present disclosure, the method further includes compressing the reaction material between the first metal substrate and the second metal substrate. Welding the first metal substrate to the second metal substrate includes heating the reaction material to form a metallurgical joint between the first metal substrate and the second metal substrate.

According to further aspects of the present disclosure, the reaction material defines a geometry configured to control flow of molten material when welding the first metal substrate to the second metal substrate.

According to further aspects of the present disclosure, the reaction material is a multi-functional reaction material including an internal material and an external material. The internal material is different than the external material.

According to further aspects of the present disclosure, the internal material and the external material each contact the first metal substrate and the second metal substrate prior to welding the first metal substrate to the second metal substrate.

According to further aspects of the present disclosure, attaching the reaction material to the first faying surface via ultrasonic welding includes contacting a first exterior surface of the first metal substrate opposite the first faying surface with an anvil, contacting the reaction material with a welding horn, and vibrating the welding horn at a predetermined frequency to thereby ultrasonically weld the reaction material to the first faying surface.

According to further aspects of the present disclosure, welding the first metal substrate to the second metal substrate via fusion welding includes applying a first electrode to the first metal substrate and a second electrode to the second metal substrate and heating the reaction material via the first electrode and the second electrode to thereby form a metallurgical joint between the first metal substrate and the second metal substrate.

According to further aspects of the present disclosure, the reaction material is a multi-functional reaction material including a first material and a second material. The first material is different than the second material. The first material is configured to promote attaching the reaction material to the first faying surface via ultrasonic welding, and the second material configured to promote welding the first metal substrate to the second metal substrate via fusion welding.

According to further aspects of the present disclosure, the reaction material is a multi-functional reaction material including a first material and a second material. The first material has a first resistivity and a first liquidus temperature, and the second material has a second resistivity and a second liquidus temperature. The first resistivity is higher than the second resistivity, and the first liquidus temperature is lower than the second liquidus temperature.

According to aspects of the present disclosure, a method includes selecting a first faying surface of a first metal substrate, placing a reaction material on the first faying surface, attaching the reaction material to the first faying surface, disposing, after attaching the reaction material to the first faying surface, a second faying surface in contact with the reaction material, and welding the first metal substrate to the second metal substrate. The reaction material is configured to form a metallurgical joint between the first faying surface and a second faying surface of a second metal substrate. The attaching includes contacting a first exterior surface of the first metal substrate opposite the first faying surface with an anvil, contacting the reaction material with a welding horn, and vibrating the welding horn at a predetermined frequency to thereby ultrasonically weld the reaction material to the first faying surface. The welding includes compressing the reaction material between the first metal substrate and the second metal substrate, heating the reaction material above a liquidus temperature of the reaction material, and maintaining a temperature of the first metal substrate and the second metal substrate below a solidus temperature.

According to further aspects of the present disclosure, heating the reaction material includes resistive heating of the reaction material between a pair of electrodes, compressing the reaction material between the first metal substrate and the second metal substrate is performed using the pair of electrodes, the reaction material defines a second surface opposite the second faying surface, the second surface being generally flat, the reaction material is a multi-functional reaction material including a first material and a second material, the first material has a first resistivity, a first liquidus temperature, and a first format, the second material has a second resistivity, a second liquidus temperature, and a second format, the first format is selected from the group consisting of foil, wire, multi-layer film, powder, and paste, the second format is selected from the group consisting of foil, wire, multi-layer film, powder, and paste, the first format is a different format than the second format, the second resistivity is higher than the first resistivity, and the second liquidus temperature is lower than the first liquidus temperature.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

FIG. 2A is a schematic illustration of a plan view of a multi-functional reaction material according to aspects of the present disclosure;

FIG. 2B is a schematic illustration of a cross-sectional view of the multi-functional reaction material of FIG. 2A, taken along section line 2B;

DETAILED DESCRIPTION

Systems and methods in accordance with aspects of the present disclosure optimize performance of joints formed using reaction metallurgical joining ("RMJ") processes by attaching reaction materials to a faying surface using ultrasonic welding.

Beneficially, in some aspects, ultrasonic welding of the reaction material is used to introduce desired surface textures of the reaction material. In some aspects, the desired surface textures increase contact resistance between the reaction material and faying surfaces of the components to be joined. In some aspects, the desired surface texture of the reaction material is present prior to attachment of the reaction material and the ultrasonic welding process is designed to attach the reaction material without substantially disturbing the desired surface texture. In some aspects, the ultrasonic welding process is designed to produce the desired surface texture while attaching the reaction material to the faying surface.

In some aspects, systems and methods of the present disclosure may improve current intensity across a reaction material. In some aspects, systems and methods of the present disclosure may improve joint strength between two metal substrates. In some aspects, systems and methods of the present disclosure may reduce material ejection and material loss during the RMJ processes.

Figure 1A:
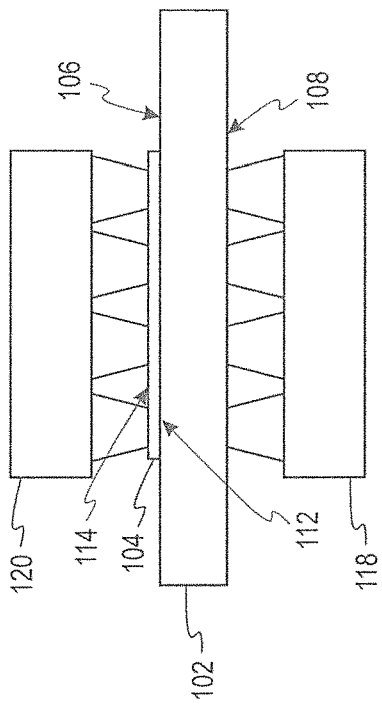
FIG. 1A is a schematic illustration of a side view of a first substrate and reaction material, according to aspects of the present disclosure.

FIGS. 1A-1D are schematic illustrations of joining of metal substrates including pre-placement of a reaction material on a faying surface of at least one of the metal substrates using ultrasonic welding. FIG. 1A is a schematic illustration of a first metal substrate 102 and reaction material 104.

The first metal substrate 102 includes a first faying surface 106 opposite a first exterior surface 108. The first metal substrate 102 is configured to conduct an electrical current therethrough. The first metal substrate 102 can be formed from a suitable conductor. In some aspects, the first metal substrate 102 is formed from copper, aluminum, alloys thereof, and the like. The first metal substrate 102 has a solidus temperature. The solidus temperature is the highest temperature at which the first metal substrate 102 is in a completely solid state. The solidus temperature is dependent on the particular composition of the first metal substrate 102.

The reaction material is disposed on the first faying surface 106 at or proximate a location where a metallurgical joint is desired. The reaction material 104 is configured to form a metallurgical joint between the first metal substrate 102 and a second metal substrate 110 (FIG. 1C) adjacent the first metal substrate 102. The reaction material 104 is a material suitable to form a metallurgical joint between the first metal substrate 102 and the second metal substrate 110. In some aspects, the reaction material 104 is selected from the group consisting of copper, phosphorous, tin, nickel, gold, and the like.

The reaction material 104 includes a first surface 112 contacting the first faying surface 106 and a second surface 114 opposite the first surface 112. The first surface 112 defines a first texture and the second surface 114 defines a second texture. The first texture and the second texture can be selected to optimize performance of a subsequent metallurgical joint 116 (FIG. 1D).

The reaction material 104 defines a geometry. Beneficially, the geometry and/or the surface texture can be selected to control flow of liquid reaction material during the joining process. Further, the geometry and/or surface texture can be selected to optimize electrical performance, optimize mechanical performance such as strength or robustness, or optimize thermal performance of the subsequent metallurgical joint 116. In the illustrated figure, the geometry of the reaction material is generally rectangular with the first surface 112 and the second surface 114 being generally flat. Beneficially, the generally rectangular geometry more evenly distributes current intensity though the reaction material 104 as compared to, for example, a generally spherical deposit of reaction material 104. While the geometry of the illustrated figures is generally rectangular, it is contemplated that other geometries may be used.

The reaction material 104 has a resistivity, a liquidus temperature, and a format. The resistivity is a measure of inherent electrical resistance of a material. The resistivity is dependent on the particular composition of the reaction material 104. Applying a voltage to the reaction material 104 produces a current therethrough.

The fusion between the reaction material and the substrate can be optimized by selecting a desired resistivity of the reaction material 104, selecting a desired texture of the reaction material 104, selecting a desired geometry of the reaction material 104, or combinations thereof. For example, a reaction material 104 having a have resistivity will generate a higher joule heating than a reaction material 104 having a low resistivity. Further, a reaction material 104 having a low cross-sectional area will have a generally higher resistance and hence generates more heat than a reaction material 104 having a high cross-sectional area. Yet further, a reaction material 104 having a roughened surface texture may provide a generally lower contact area and therefore generate more heat at points of contact than a similarly shaped reaction material 104 having a generally smooth surface texture with an overall greater area of electrical contact.

The liquidus temperature is the lowest temperature that the reaction material 104 is completely liquid. The liquidus temperature is dependent on the particular composition of the reaction material 104.

The format is the physical form of the reaction material. The format can include, for example, foil, wire, multi-layer film, powder, paste, combinations thereof, and the like.

Figure 1B:
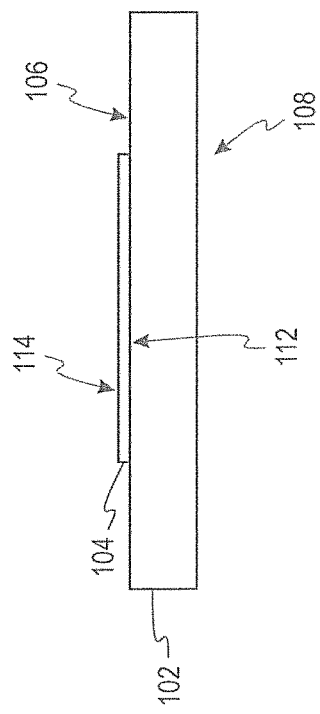
FIG. 1B is a schematic illustration of ultrasonic welding of the first substrate and the reaction material of FIG. 1A, according to aspects of the present disclosure.
Figure 1D:
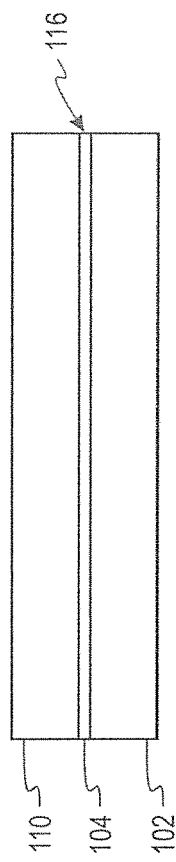
FIG. 1D is a schematic illustration of a metallurgical joint between the first substrate an the second metal substrate of FIG. 1C, according to aspects of the present disclosure.

FIG. 1B is a schematic illustration of ultrasonic welding of the reaction material 104 to the first metal substrate 102. After the reaction material 104 is disposed on the first faying surface 106 at or proximate the location where the metallurgical joint 116 is desired, the first exterior surface 108 of the first metal substrate 102 is contacted with an anvil 118 and the second surface 114 of the reaction material 104 is contacted with a welding horn 120 to attach the reaction material 104 to the first metal substrate 102. The anvil 118 is configured to provide a relatively stiff mass sufficient for opposing the welding horn 120 during the ultrasonic welding process.

The welding horn 120 is configured to vibrate at a predetermined frequency to thereby ultrasonically weld the reaction material 104 to the first faying surface 106. In some aspects, the welding horn 120 is configured to attach the reaction material 104 to the first faying surface 106 without substantially disturbing the first texture, the second texture, or geometry of the reaction material 104, thereby resulting in a desired texture on at least one of the first surface 112 and the second surface 114 or a desired geometry of the reaction material 104. In some aspects, the welding horn 120 is configured to alter at least one of the first texture, the second texture, or geometry of the reaction material 104, thereby resulting in a desired texture on at least one of the first surface 112 and the second surface 114 or a desired geometry of the reaction material 104. After the reaction material is attached to the first faying surface 106 of the first metal substrate 102, the anvil 118 and the welding horn 120 are removed.

Figure 1C:
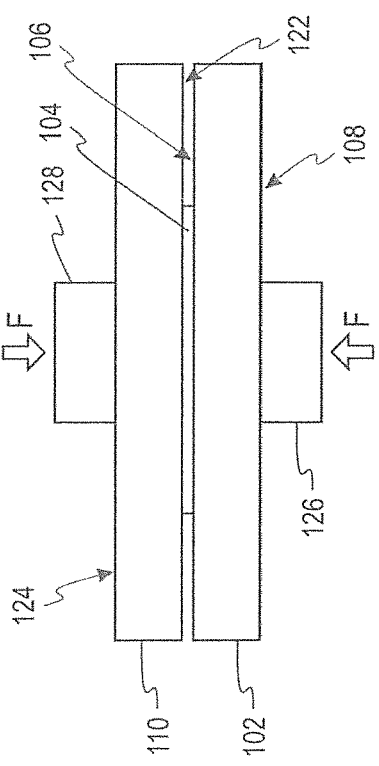
FIG. 1C is a schematic illustration of a joining process for the first substrate and a second metal substrate, according to aspects of the present disclosure.

FIG. 1C is a schematic illustration of a joining process for the first substrate 102 and a second metal substrate 110, according to aspects of the present disclosure. The second metal substrate 110 includes a second faying surface 122 opposite a second exterior surface 124. The second metal substrate 110 is configured to conduct an electrical current therethrough. The second metal substrate 110 can be formed from a suitable conductor. In some aspects, the second metal substrate 110 is formed from copper, aluminum, alloys thereof, and the like.

The second metal substrate 110 has a solidus temperature. The solidus temperature is the highest temperature at which the second metal substrate 110 is in a completely solid state. The solidus temperature is dependent on the particular composition of the second metal substrate 110.

A first electrode 126 is brought into contact with the first exterior surface 108 and a second electrode 128 is brought into contact with the second exterior surface 124. The first electrode 126 and the second electrode 128 are configured to deliver an electrical current therebetween. The electrical current passed between the electrodes is configured to pass through the reaction material 104 and thereby heat the reaction material 104 to or above the liquidus temperature.

A compressive force F is applied to the first metal substrate 102 and the second metal substrate 110 in opposing directions, thereby compressing the reaction material 104 between the first metal substrate 102 and the second metal substrate 110. The compressive force F can be generated using servo motors, pneumatics, piezoelectric materials, combinations thereof, and the like. In some aspects, the compressive force F is applied through the first electrode 126 and the second electrode 128. Additionally or alternatively, the compressive force F can be applied or supplemented through members separate from the first electrode 126 and the second electrode 128. After sufficient compressive force F is applied to the first metal substrate 102, the second metal substrate 110, and the reaction material 104, as well as sufficient temperatures being applied to the reaction material 104, the first electrode 126 and the second electrode 128 are removed from the first metal substrate 102 and the second metal substrate 110.

FIG. 1D is a schematic illustration of the resulting metallurgical joint 116 bonding the first substrate 102 to the second metal substrate 110 after removal of the first electrode 126 and the second electrode 128. Beneficially, systems and methods of the present disclosure can reduce or eliminate the need to remove excess reaction material 104 after the metallurgical joint 116 is formed because the amount of reaction material 104 can be precisely measured and precisely deposited on the first faying surface 106.

FIG. 2A is a schematic illustration of a multi-functional reaction material 204 according to aspects of the present disclosure. The multi-functional reaction material 204 includes a first material 204a and a second material 204b. In the illustrated figure, the first material 204a is an internal material and the second material 204b is an external material. The first material 204a and the second material 204b can be selected to optimize properties of the metallurgical joint 116 formed using the multi-functional reaction material 204. For example, the first material 204a may be selected to have a relatively high resistivity and relatively low liquidus temperature while the second material 204b may be selected to have a relatively low resistivity and a relatively high liquidus temperature.

In some aspects, the first material 204a is configured to promote attaching the multi-functional reaction material 204 to the first faying surface 106 via ultrasonic welding, and the second material 204b is configured to promote the metallurgical joint 116 between the first metal substrate 102 and the second metal substrate 110. Additionally or alternatively, the first material 204a and the second material 204b can be selected to control flow of liquid reaction material during a metallurgical joining process. In some aspects, the first material 204a is in a first format and the second material 204b is in a second format different from the first format.

FIG. 2B is a cross-sectional schematic illustration of the multi-functional reaction material 204 taken along line 2B of FIG. 2A. As can be seen from the illustrated figure, both the first material 204a and the second material 204b can extend from the first surface 112 to the second surface 114. This allows both the first material 204a and the second material 204b to contact the first faying surface 106 and the second faying surface 122 prior to heating the multi-functional reaction material 204.

In some aspects, the first material 204a encloses the second material 204b such that only the first material 204a contacts the first faying surface 106 and the second faying surface 122 prior to heating the multi-functional reaction material 204.

Figure 3:
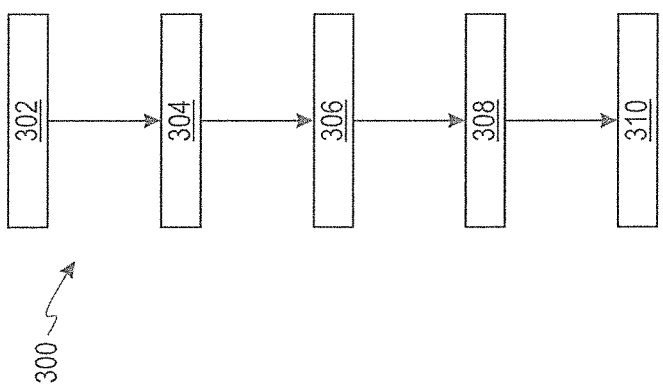
FIG. 3 is a flowchart of a method of joining metallic components employing pre-placement of reaction material using ultrasonic welding, according to aspects of the present disclosure.

FIG. 3 is a flowchart of a method 300 of joining metallic components employing pre-placement of reaction material 104 using ultrasonic welding. The method 300 can be used to optimize properties of the metallurgical joint 116, reduce or eliminate cleaning the metallurgical joint 116, and provide for depositing of the reaction material 104 at room temperature. The method includes selecting 302 the first faying surface 106 of the first metal substrate 102, placing 304 the reaction material 104 on the first faying surface 106, attaching 306 the reaction material 104 to the first faying surface 106. The method 300 may further include disposing 308, after attaching the reaction material 104 to the first faying surface 106, the second faying surface 122 in contact with the reaction material 104, and welding 310 the first metal substrate 102 to the second metal substrate 110.

Figure 4:
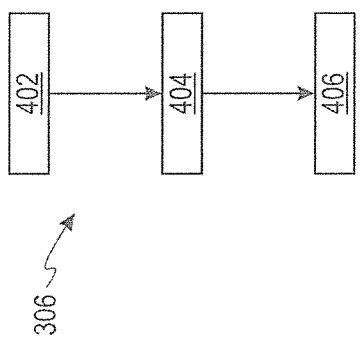
FIG. 4 is a flowchart of a method of attaching the reaction material to a first faying surface, according to aspects of the present disclosure.

Referring now to FIG. 4, in some aspects, attaching 306 the reaction material 104 to the first faying surface 106 includes contacting 402 the first metal substrate 102 opposite the first faying surface 106 with an anvil 118, contacting 404 the reaction material 104 with a welding horn 120, and vibrating 406 the welding horn 120 at a predetermined frequency to thereby ultrasonically weld the reaction material 104 to the first faying surface 106.

Figure 5:
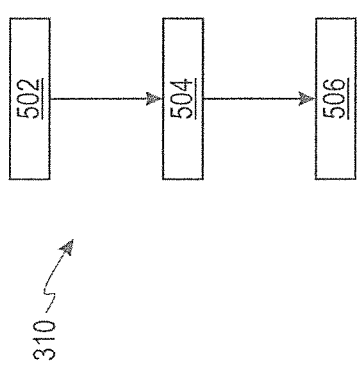
FIG. 5 is a flowchart of a method of welding the first metal substrate to the second metal substrate of FIG. 1C, according to aspects of the present disclosure.

Referring now to FIG. 5, in some aspects, welding 310 the first metal substrate 102 to the second metal substrate 110 includes compressing 502 the reaction material 104 between the first metal substrate 102 and the second metal substrate 110, heating 504 the reaction material 104 above a liquidus temperature of the reaction material 104, and maintaining 506 a temperature of the first metal substrate 102 and the second metal substrate 110 below a solidus temperature.

While the above-described RMJ process involves resistive heating of the reaction material, other fusion welding processes may be used such as laser welding, Tungsten Inert Gas (TIG) welding, induction heating, or brazing.

The following examples are meant to illustrate the disclosure and are not to be viewed in any way as limiting to the scope of the disclosure.

EXAMPLES

Comparative Example 1

Fifteen RMJ samples are prepared with reaction material being deposited onto a copper substrate using a cold-metaltransfer process. After forming the RMJ joint with another copper substrate, a mean weight loss of 15% of the pre-placed reaction material is observed.

Comparative Example 2

Fifteen RMJ samples are prepared with reaction material being deposited onto a copper substrate and attached to a first faying surface using ultrasonic welding. After forming the RMJ joint with another copper substrate, a mean weight loss of 2.65% of the pre-placed reaction material is observed. Moreover, a 100% success rate is observed for all tensile strength tests, indicating the joint is stronger than the base metal.

While the best modes for carrying out the disclosure have been described in detail, those familiar with the art to which this disclosure relates will recognize various alternative designs and embodiments for practicing the disclosure within the scope of the appended claims.

What is claimed is:

1. A method comprising:
    selecting a first faying surface of a first metal substrate;
    placing a material on the first faying surface, the material configured to form a metallurgical joint between the first faying surface and a second faying surface of a second metal substrate, the material configured to form by-products with material of the first faying surface;
    attaching the material to the first faying surface via ultrasonic welding;
    disposing, after attaching the material to the first faying surface, the second faying surface in contact with the material; and
    welding the first metal substrate to the second metal substrate via fusion welding.

2. The method of claim 1, further comprising compressing the material between the first metal substrate and the second metal substrate, wherein welding the first metal substrate to the second metal substrate includes heating the material to form the metallurgical joint between the first metal substrate and the second metal substrate.

3. The method of claim 1, wherein the first metal substrate includes at least one substrate-edge corresponding to the first faying surface, the material defines a geometry including a surface corresponding to the first faying surface, the surface including at least one surface-edge there along such that each of the at least one surface-edge is geometrically similar to a respective one of the at least one substrate-edge to thereby control flow of molten material when welding the first metal substrate to the second metal substrate such that the molten material reaches to and is continuous along the at least one substrate-edge.

4. The method of claim 1, wherein the material is a multi-functional material including an internal material and an external material, the internal material being different than the external material.

5. The method of claim 4, wherein the internal material and the external material each contact the first metal substrate and the second metal substrate prior to welding the first metal substrate to the second metal substrate.

6. The method of claim 1, wherein attaching the material to the first faying surface via ultrasonic welding includes:
    contacting a first exterior surface of the first metal substrate opposite the first faying surface with an anvil;
    contacting the material with a welding horn; and
    vibrating the welding horn at a predetermined frequency to thereby ultrasonically weld the material to the first faying surface.

7. The method of claim 1, wherein welding the first metal substrate to the second metal substrate via fusion welding includes:
    applying a first electrode to the first metal substrate and a second electrode to the second metal substrate; and
    heating the material via the first electrode and the second electrode to thereby form the metallurgical joint between the first metal substrate and the second metal substrate.

8. The method of claim 1, wherein the material is a multi-functional material including a first material and a second material, the first material being different than the second material, the first material configured to promote attaching the material to the first faying surface via ultrasonic welding, and the second material configured to promote welding the first metal substrate to the second metal substrate via fusion welding.

9. The method of claim 1, wherein the material is a multi-functional material including a first material and a second material, the first material having a first resistivity and a first liquidus temperature, the second material having a second resistivity and a second liquidus temperature, the first resistivity being higher than the second resistivity, the first liquidus temperature being lower than the second liquidus temperature.

10. A method comprising:
    selecting a first faying surface of a first metal substrate;
    placing a material on the first faying surface, the material configured to form a metallurgical joint between the first faying surface and a second faying surface of a second metal substrate, the material configured to form by-products with material of the first faying surface;
    attaching the material to the first faying surface, wherein attaching includes:
        contacting a first exterior surface of the first metal substrate opposite the first faying surface with an anvil,
        contacting the material with a welding horn, and
        vibrating the welding horn at a predetermined frequency to thereby ultrasonically weld the material to the first faying surface;
    disposing, after attaching the material to the first faying surface, the second faying surface in contact with the material; and
    welding the first metal substrate to the second metal substrate to form the metallurgical joint including material from the first metal substrate and material from the second metal substrate, wherein welding includes:
        compressing the material between the first metal substrate and the second metal substrate,
        heating the material above a liquidus temperature of the material, and
        maintaining a temperature of the first metal substrate and the second metal substrate below a solidus temperature.

11. The method of claim 10,
    wherein heating the material includes resistive heating of the material between a pair of electrodes;
    wherein compressing the material between the first metal substrate and the second metal substrate is performed using the pair of electrodes;
    wherein the material defines a second surface opposite the second faying surface, the second surface being generally flat;
    wherein the material is a multi-functional material including a first material and a second material;

wherein the first material has a first resistivity, a first liquidus temperature, and a first format;

wherein the second material has a second resistivity, a second liquidus temperature, and a second format;

wherein the first format is selected from the group consisting of foil, wire, multi-layer film, powder, and paste;

wherein the second format is selected from the group consisting of foil, wire, multi-layer film, powder, and paste;

wherein the first format is a different format than the second format;

wherein the second resistivity is higher than the first resistivity; and wherein the second liquidus temperature is lower than the first liquidus temperature.

* * * * *